Aug. 28, 1945.   J. A. MacLEAN, JR   2,383,808
FLOOR CLIP
Filed July 8, 1942
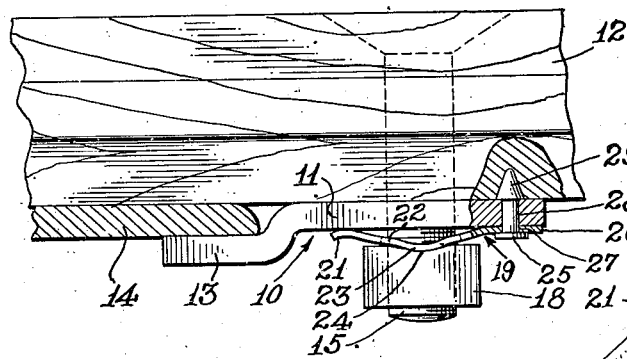
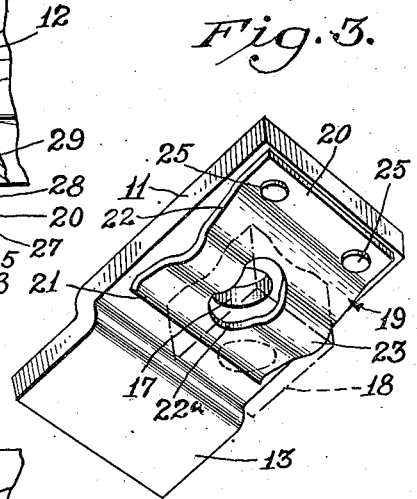
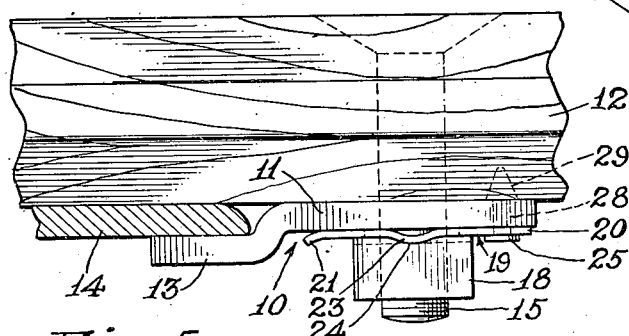
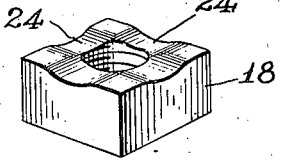
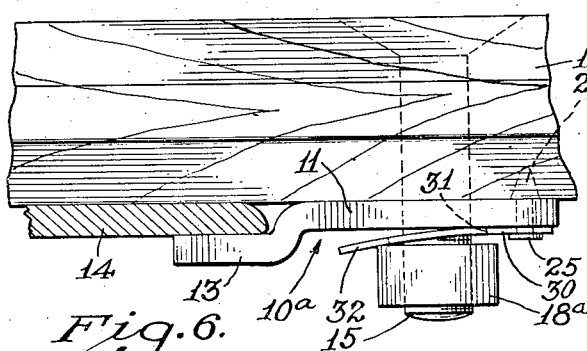
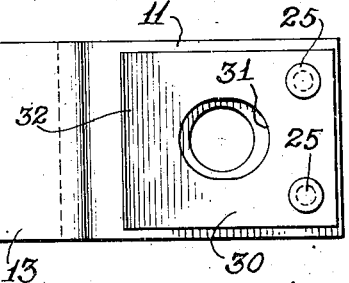
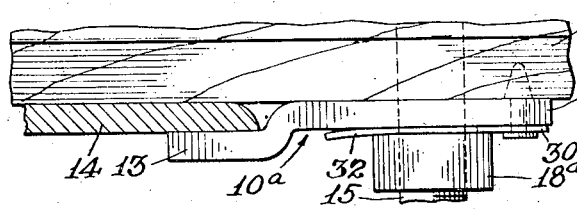
Inventor
John A. MacLean, Jr.
By
McCaleb, Wendt & Dickinson
Attorneys Patented Aug. 28, 1945

2,383,808

UNITED STATES PATENT OFFICE 2,383,808

FLOOR CLIP

John A. MacLean, Jr., Winnetka, Ill., assignor to MacLean-Fogg Lock Nut Company, Chicago, Ill., a corporation of Illinois Application July 8, 1942, Serial No. 450,158

5 Claims. (Cl. 189—35)

My invention relates to clips for securing together separable members such as floor boards and the underframe structure in railway cars, and more particularly concerns improvements in the holding qualities of the clips.

Railway car floor clips which merely provide for locking the nuts of the fastening bolts against unintentional loosening, do not meet the problem of looseness resulting from floor board shrinkage or eventual wearing in or drawing down of the bolt heads into the boards due to stresses and strains imposed by weaving of the underframe when the car is in use. The floor clips are generally constructed from a malleable grade of steel and in consequence, do not have enough resiliency in themselves to provide for any practicable amount of tensioning or take-up. Ordinary spring washers may, of course, be used under the nuts of the bolt to take up slack that may develop in the course of time, but this entails a multiplication of parts that must be handled for installation of the clips.

One of the principal aims of the present invention is to provide an improved floor clip of unitary construction which is equipped not only for effectively locking the nut of the fastening bolt against unintentional loosening, but also for taking up shrinkage or wear slack that may occur subsequent to installation.

Another object of the invention is to provide a floor clip having nut locking and slack take-up means secured thereto in a novel manner to provide the clip also with means for holding the clip against rotation relative to the fastening bolt.

Another object of my invention is to provide a floor clip in which the main body of the clip is adapted to be made of the usual weight of inexpensive malleable steel while the nut locking and tensioning means comprises a separately formed, light gauge spring steel member permanently secured thereto.

Still another object of the invention is to provide a floor clip in which take-up tension is applied in an evenly distributed, thorough manner between the clip and the fastening bolt.

A further object is to provide novel nut-locking means for a floor clip enabling the nut to be tightened and coincidentally locked against unintentional loosening, and to be backed off and intentionally loosened without the need for any manipulative effort other than turning of the nut.

Another object of the invention is to provide a floor clip of the foregoing general character which can be produced at low cost of simple and inexpensive materials by simple quantity production methods of manufacture.

Other objects and advantages of the invention will be apparent from the following description of a specific embodiment of the invention and the accompanying drawing showing the same, in which similar characters of reference indicate similar parts throughout the several views. In the drawing:

Figure 1 is a fragmentary vertical sectional view through a railway car floor structure, showing in side elevation, partially broken away and in section, a clip embodying the features of my invention, with the nut of the fastening bolt untightened;

Fig. 2 is a sectional elevational view similar to Fig. 1 but showing the nut of the fastening bolt as it appears when fully tightened;

Fig. 3 is a bottom perspective view of the novel floor clip shown in Figs. 1 and 2;

Fig. 4 is a top perspective view of the nut for the fastening bolt formed with a special complementary nut lock gripping face;

Fig. 5 is a vertical sectional view through a floor construction showing, in side elevation, a slightly modified form of the floor clip, with the nut of the fastening bolt only partially tightened;

Fig. 6 is a sectional elevational view similar to Fig. 5 but showing the relationship of parts when the fastening nut has been fully tightened; and Fig. 7 is a bottom plan view of the modified clip shown in Figs. 5 and 6.

By way of exemplifying one important use of my invention, I have chosen to illustrate in the drawing a floor clip 10 (Figs. 1, 2 and 3) of elongated rectangular form, the body of which is formed from a suitable gauge of malleable sheet steel. The clip 10 comprises an elongated portion 11 adapted to bear against the underface of a floor board 12, and a shorter offset portion or flange 13 adapted to engage the underface of a sill flange 14 of a railway car underframe structure upon which the floor board 12 rests. The floor board 12 carries a fastening bolt 15, the threaded shank of which projects substantially below the lower face of the floor board and is adapted to extend through a substantially central bolt aperture 17 formed in the board-engaging portion 11 of the clip. A nut 18 is adapted to be threaded onto the shank of the bolt 15 for securing the clip in place.

According to the present invention, novel means combining all of the desirable attributes of a positive nut-lock and of a slack-takeup tensioning device is provided on the clip 10 for acting upon the nut 18. Such means may comprise a bowed spring washer plate 19 of rectangular form and slightly shorter and narrower than the lower face of the board-engaging portion 11 of the clip although somewhat wider than the nut 18. The washer plate 19 may be made of a relatively thin spring steel stock that is readily susceptible of fabrication by a stamping process in which the washer is formed with a flat flange 20 at one end, a transverse downwardly curving but co-planar sliding-pad or bearing flange 21 at its opposite end, and an intermediate downwardly looped spring bow 22. At the center of the spring bow is a longitudinally elongated bolt aperture 22ª which registers with the bolt aperture 17 in the clip. Thus, when the spring washer plate 19 is interposed between the nut 18 and the lower face of the board-engaging portion 11 with the end flanges 20 and 21 bearing against the clip, and the nut 18 is driven up against the spring bow 22, the latter flattens out against the engaged face of the clip and opposes the nut with gradually increasing spring tension, reaching a maximum when the nut has been driven fully home. The extent of the flattening out of the spring bow 22 may be visualized by a comparison of Figs. 1 and 2. Should there be any loosening of the bolted parts thereafter as for example due to shrinkage of the floor boards 12, or wearing in and drawing down of the head of the bolt 15, the spring bow 22 will continue to maintain the spring tension to a substantial extent, thus taking up the slack and preventing looseness between the clip 10 and the floor board 12 as well as the sill 14.

If a more definite restraint upon unintentional loosening of the nut 18, such as might possibly occur even in spite of the spring tension of the washer, is desired, a positive nut-locking structure may be provided in the form of a slight, gently arcuate hump or ridge 23 (somewhat over-prominently illustrated in Figs. 1, 2 and 3) projecting down at the bottom of the spring bow portion 22 of the washer and adapted to be received in either one of a pair of complementary, shallow locking grooves 24 diametrically intersecting at right angles within the engaging face of the nut 18 (Fig. 4). Because of the resiliency and shallow arcuate nature of the locking ridge 23 and the shallow, substantially shoulderless nature of the grooves 24, the ungrooved portions of the thrust face of the nut will cam over the ridge 23 and the ridge will flatten out without any undue resistance to turning either when driving the nut tight or when backing it off. However, when, as shown in Fig. 2, the nut is driven tight and the locking ridge 23 engages within one of the locking grooves 24 of the nut, a very effective interlock is provided against unintentional loosening rotation of the nut. With the combination of this nut locking feature and the spring tensioning feature of the washer plate 19, there is positive assurance of permanent, tight securement of the clip 10, and thereby of the floor board 12 to the sill 14. The greater width, and substantially greater length of the washer plate than the nut 18 as indicated in Fig. 3, and the centered, equalized manner in which the spring bow 22 engages against the nut, assures constant uniform take-up pressure.

The spring washer plate 19 is preferably permanently attached to the board-engaging portion 11 of the clip so as to form therewith a unitary structure that may be handled as one piece for installation and which will avoid any danger of separation and loss of the washer plate. To this end, the flat flange 20 of the washer plate may be secured in any preferred manner to the face of the board-engaging portion 11, preferably adjacent to the outer end of the clip. In the present instance securement is effected by use of rivets 25 which extend through suitable apertures 27 (Fig. 1) in the flange 20 and rivet apertures 28 in the clip portion 11 near its outer end. A pair of the rivets 25 will suffice, one being located adjacent each side of the clip equidistantly spaced from the bolt aperture 17. With the flange 20 thus held fast, the bearing flange 21 is adapted to slide on the opposed face of the clip portion 11 as the spring bow 22 is caused to flatten out by drawing up of the nut 18 or springs back as the nut is backed off or otherwise slackens.

According to the invention, the rivets 25 serve also as means for holding the clip 10 against turning relative to the bolt 15 and the floor board 12. The upper ends of the rivets 25 are therefore formed with pointed, preferably conical heads 29 which project substantially beyond the upper face of the board-engaging portion 11 of the clip, thus providing prongs adapted to be driven into the opposing face of the floor boards 12 in the course of fastening the clip in place. Such prongs 29 are particularly advantageous for holding the clip against turning when the nut 18 is driven home against the gradually increasing opposition afforded by the spring bow 22 and the nut-locking ridge 23 of the washer plate 19.

In the modified form of clip 10ª shown in Figs. 5, 6 and 7, all parts of the clip structure are the same as described in connection with the clip 10 of Figs. 1 to 3, except that a different style of attached spring washer 30 is used and an ordinary nut 18ª with a conventional flat thrust face may be employed. The washer 30 is simply an elongated rectangular spring steel plate slightly narrower and somewhat shorter than the board-engaging portion 11 of the clip and entirely undeformed except for a longitudinally elongated bolt aperture 31 and a gentle downward curving large radius deflection of the nut-opposing portion of the plate away from the clip portion 11, as indicated at 32. In this way, a substantial spring take-up tension is provided between the nut 18ª and the body of the clip with, however, the principal pressure of the spring applied against the inner side of the thrust face of the nut where the greatest deflection tension of the spring portion 32 occurs. Thus, although when the spring washer plate 30 is flexed by tightening of the nut 18ª, it is substantially flattened out, as shown in Fig. 6, there is always a resistance offered by the curved portion 32 against the adjacent edge of the nut to hold the nut against unintentional loosening. Any slight loosening of the bolted parts will cause the curved portion 32 of the washer plate to spring down and take up slack and at the same time even more thoroughly engage against the adjacent edge of the nut to hold the nut against turning loose.

This is true whether the looseness of the nut be the result of its being turned loose, or of its never having been turned up tightly, or of the shrinkage of the boards.

Any tendency of a square nut, for example, to turn out of a position where the washer plate presses against and along one of its edges and toward a position 45° therefrom where a corner of the nut engages the plate, will be resisted by virtue of the fact that the corner, being at a greater radius from the axis of the bolt than is the edge, would have to deflect the curved portion of the plate further upwardly, which would offer increased resistance.

As a result, the nut 18ᵃ is locked against loosening rotation, perhaps not quite as effectively as with the interengaging locking hump 23 and the locking grooves 24 hereinbefore described, but nevertheless reasonably well.

While the invention is susceptible of various modifications and alternative constructions, I have shown in the drawing and have herein described in detail certain preferred embodiments, but it is to be understood that I do not thereby intend to limit the invention to the specific forms disclosed, but intend to cover all modifications and alternative constructions embraced within the spirit and scope of the invention as expressed in the appended claims.

I claim as my invention:

1. In combination in a floor clip having an apertured body arranged to engage a pair of floor members to be secured together by the clip, a spring washer member adapted to be engaged by the thrust face of the nut of a bolt by which the clip is secured in place, and means securing the washer plate to the clip body, said securing means including a rivet having a head shaped as a prong to enter into one of the members held by the clip to hold the clip against turning relatively to such member.

2. A floor clip having a flat metal body formed with a bolt aperture and a pair of smaller spaced apertures equidistantly spaced from said bolt aperture, a spring washer plate structure so related to said bolt aperture as to be interposed between the clip body and the thrust face of a fastening bolt accommodated by the bolt aperture, apertures in the washer plate structure registering with the pair of smaller apertures in the clip body, and securing means comprising rivets extending through the registering apertures and formed with heads shaped as conical prongs projecting from the opposite side of the clip body to interengage with a floor member engaged by the clip to hold the clip against turning relative to such member.

3. In a floor clip the combination of a metal member provided with a floor-engaging flange having a bolt aperture and a sill-engaging flange which is offset with respect to said floor-engaging flange by the amount of the thickness of a sill flange, with a resilient metal member carried by said floor-engaging flange on the side opposite to that portion which is intended to engage the floor, said resilient metal member having a centrally located enlarged aperture to pass a threaded member located in the aperture of the clip and being free at one end and secured at the other end to said floor-engaging flange, means for effecting said latter securement comprising a headed metal member passing through the resilient member and through the floor-engaging flange and having on that side engaging the floor a pointed formation for preventing rotation of the clip on its bolt.

4. In a floor clip the combination of a metal member provided with a floor-engaging flange having a bolt aperture and a sill-engaging flange which is offset with respect to said floor-engaging flame by the amount of the thickness of a sill flange, with a resilient metal member carried by said floor-engaging flange on the side opposite to that portion which is intended to engage the floor, said resilient metal member having a centrally located enlarged aperture to pass a threaded member located in the aperture of the clip and being free at one end and secured at the other end to said floor-engaging flange, means for effecting said latter securement comprising a headed metal member passing through the resilient member and through the floor-engaging flange and having on that side engaging the floor a pointed formation for preventing rotation of the clip on its bolt, said resilient metal member being curved outwardly away from said floor-engaging flange toward the free end of said resilient member and being arranged and constructed to engage the inner edge of a nut which is between one of its lateral faces and the inner face of the nut to prevent the nut from turning.

5. In a floor clip the combination of a metal member provided with a floor-engaging flange having a bolt aperture and a sill-engaging flange which is offset with respect to said floor-engaging flange by the amount of the thickness of a sill flange, with a resilient metal member carried by said floor-engaging flange on the side opposite to that portion which is intended to engage the floor, said resilient metal member having a centrally located enlarged aperture to pass a threaded member located in the aperture of the clip and being free at one end and secured at the other end to said floor-engaging flange, means for effecting said latter securement comprising a headed metal member passing through the resilient member and through the floor-engaging flange and having on that side engaging the floor a pointed formation for preventing rotation of the clip on its bolt, said resilient member having its free end engaging said floor engaging flange and being bowed outwardly between its free end and its secured end.

JOHN A. MacLEAN, Jr.